Feb. 22, 1944.　　　　B. PINKEL　　　　2,342,164
HEAT EXCHANGER
Filed Aug. 30, 1941　　2 Sheets-Sheet 2
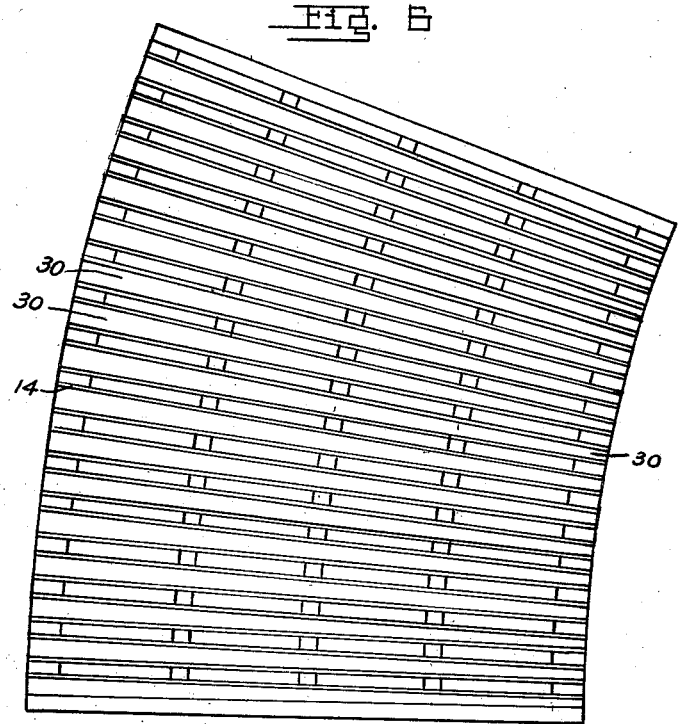
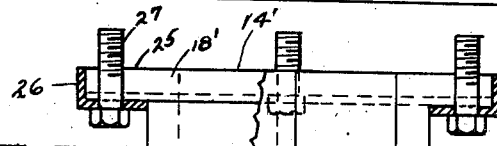
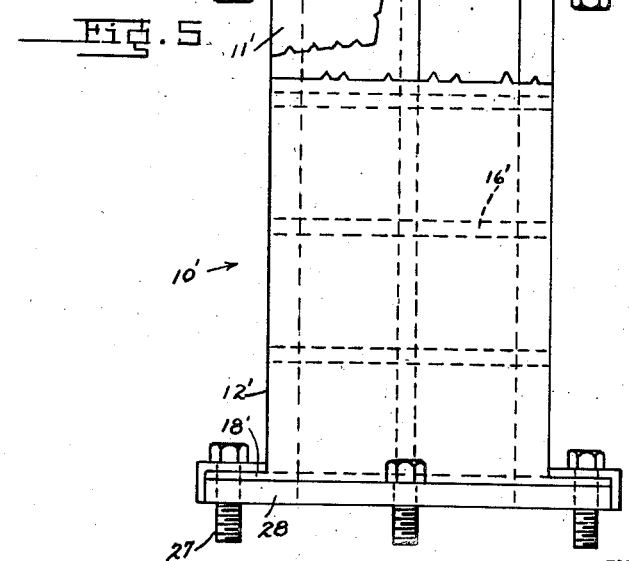
INVENTOR
Benjamin Pinkel
BY
ATTORNEY Patented Feb. 22, 1944

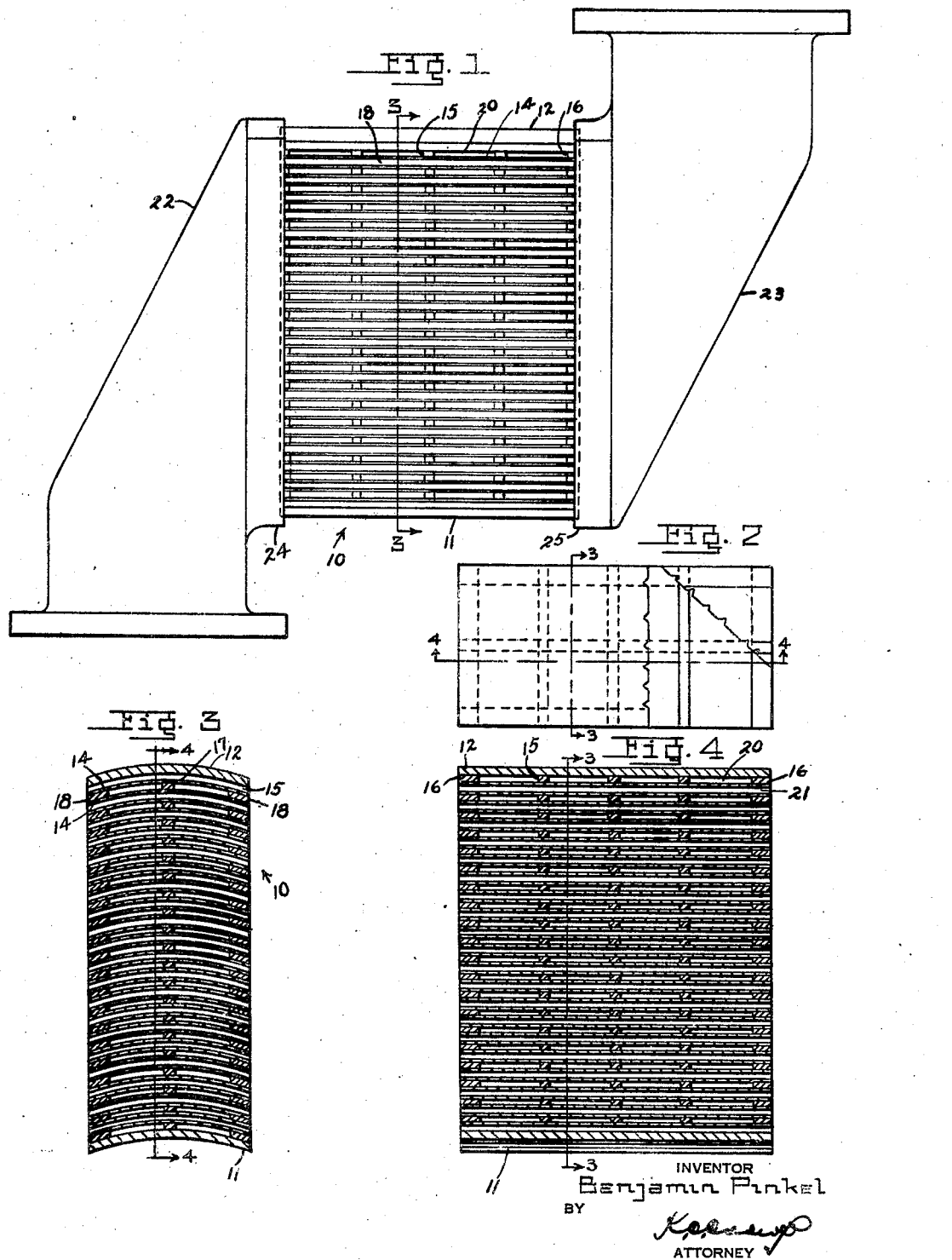

2,342,164

UNITED STATES PATENT OFFICE 2,342,164

HEAT EXCHANGER

Benjamin Pinkel, Hampton, Va.

Application August 30, 1941, Serial No. 408,927

3 Claims. (257—245)

(Granted under the act of March 3, 1883, as amended April 30, 1928; 370 O. G. 757)

This invention relates to a heat exchanger and has for an object to provide a heat exchanger particularly well adapted for use as an intercooler core on an aircraft engine.

A further object of this invention is to provide a heat exchanger which is light in weight, compact, strong, and has high cooling effectiveness.

A further object of this invention is to provide a heat exchanger having a minimum amount of indirect heat transfer surfaces and which utilizes extremely thin sheet direct heat transfer surfaces to thus achieve extreme lightness in weight.

Still a further object of this invention is to simplify manufacturing difficulties and at the same time provide close spacing of the heat transferring surfaces to thus pack a large amount of heat transfer surface into a small volume and achieve compactness.

Still a further object of this invention is to provide strength, yet lightness in weight, by curving the heat transfer plates, as a result of which difference in pressure on either side of the heat transfer plate is resisted by pure tension in some plates and pure compression in others, thus providing but little tendency for the plate to deform in bending.

Still a further object of this invention is to provide a heat exchanger, simple in construction and easy to manufacture.

Still a further object of this invention is to provide a heat exchanger for exchanging heat between two fluids flowing at angles to each other.

With the foregoing and other objects in view, the invention consists in the construction, combination and arrangement of parts hereinafter described and illustrated in the drawings, in which:

Fig. 1 is an elevational view of the heat exchanger core of this invention, assembled as part of an aircraft intercooler.

Fig. 2 is a front view of the heat exchanger core in detached position.

Fig. 3 is a sectional view of the heat exchanger core, being on line 3—3 of Figs. 1, 2 and 4.

Fig. 4 is a sectional view on lines 4—4 of Figs. 2 and 3.

Fig. 5 shows an elevational view, partly broken away, of a modified form of attaching the heat exchanger core to intercooler ducts; and Fig. 6 is an elevational view of a modified form of the core which has been modified to fit a curved space.

There is shown at 10 the heat exchanger of this invention which is disclosed as being the core of an aircraft intercooler, although it may be equally well used as the core of a vehicle radiator or other heat exchanging units wherever desired.

This heat exchanger 10 consists of a pair of end plates 11 and 12, somewhat curved as shown, and of sufficient thickness to provide adequate strength for the core. Between these end plates 11 and 12 there are provided a plurality of heat transfer plates 14 of very thin sheet metal, each curved with the same radius as the end plates 11 and 12. Each of the consecutive curved heat transfer plates 14 and the end plates 11 and 12 are separated alternately from each other by means of a plurality of curved intermediate spacer strips 15 and curved edge spacer strips 16, extending in the curved direction of the end plates and heat transfer plates, and by straight intermediate spacer strips 17 and straight edge spacer strips 18, these straight spacers 17 and 18 being parallel to the straight direction of the heat exchanger core.

As will be apparent, each of the end plates and heat transfer plates have a curvature as though they were rectangular sections cut from a cylinder, although it is obvious that if additional strength were desired they could be in the shape of rectangular sections cut from a sphere, in which case the plates would be curved in two directions instead of one and in which case both sets of spacer strips would be curved instead of only one set of spacer strips being curved.

The edge spacer strips 16 and 18 are fastened to their adjacent plates in a manner to provide a fluid-tight seal at the point of contact with their plates along the entire length of the spacer strips. The intermediate spacers 15 and 17 may be similarly attached, although it is not imperative that the seal between the intermediate spacer strips and the plates be fluid-tight. As shown, spacer strips 17 and 18 are at right angles to the spacer strips 15 and 16, although considerable latitude in the angles between these spacer strips is permissible without departing from the spirit of the invention.

As will be apparent, the fluid-tight edge spacer strips provide fluid passages between the plates, the alternate passages being at an angle to each other, such passages being at right angles to each other if the alternate spacer strips are at right angles to each other. The intermediate spacer strips serve mainly to make the flow passages 20 and 21 narrower than they would otherwise be and cause the fluids to pass therethrough in a more direct line. The intermediate spacer strips also serve to strengthen the intercooler, and the number of such spacer strips used depends on the strength requirements. The hot fluid to be cooled, which, in the case of an aircraft intercooler would be compressed air, may travel through one set of passages such as the passages 21, while the cooling fluid may travel through the other set of flow passages 20.

Strength is achieved through the curvature of the plates 14. A difference of pressure between the fluids in passages 20 and 21 causes only negligible distortion in the shape of the plates 14 because of natural resistance of a properly curved sheet to distortion by pressure. It will be noted that the spacer strips 15, 16, 17 and 18 are quite thin in the direction normal to the plates 11, 12 and 14, thus providing extremely close spacing of the plates 14, and a large number of plates 14 may occupy a small volume, thereby resulting in a very compact heat exchanger core. These spacer strips are quite small, thus providing a minimum of indirect heating surface and making for efficient use and light weight of the metal.

As shown in Fig. 1, the heat exchanger core 10 is connected to the ducts 22 and 23 of an intercooler by having the flow passages 21 leading into the flanged ends 24 and 25 of the intercooler ducts 22 and 23, any well-known method of providing a gas-tight connection between the core and the ducts being used.

In Fig. 5 is shown a modified form of the core for providing an alternative method of adjustments to ducts. In this modified form, extensions 25 are provided on the end plates 11', 12' and 14' and on the edge spacer strips 16' and 18'. Angular members 26 are fastened in suitable gas-tight manner to the extensions 25 and the end plates 11 and 12. Holes in the angular members 26 and the extensions 25 provide a means for the insertion of bolts 27 for connecting the core 10' to flanges on the fluid ducts. Shoulders 28 on end plates 11' and 12' are also provided with bolt holes for attachment to the duct flanges.

As shown in Fig. 6, the core may provide curvature to the intercooler in order to better adapt the shape of the intercooler to the space available under the cowling of the aircraft. This is done by making either or both sets of spacer strips in the form of a wedge, as shown at 30.

In operation, one set of fluid passages is connected up to the ducts through which the hot fluid, either liquid or gas, passes, thus causing the hot fluid to pass through this set of flow passages. The other set of flow passages is extended to allow the cooling fluid to pass therethrough. If the heat exchanger is in a vehicle, the cooling fluid may be merely the air through which the vehicle is passed, in which case this set of cooling fluid passages is directed in a direction to receive a maximum or desired amount of air therethrough, which may be increased if desired by a suitably placed fan. Obviously, a pair of ducts may be placed on the passage ends of this second set to conduct a cooling fluid therethrough.

Other modifications and changes in the proportions and arrangement of the parts may be made by those skilled in the art without departing from the nature of this invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. A heat exchanger comprising a plurality of curved plates arranged consecutively, spacer strips conforming in curvature to the plate surfaces for separating each plate from the adjacent plates, said spacer strips on one side of any plate lying at an angle to the spacer strips on the other side of the plate, said spacer strips being attached to said plates along their faces of contact in a gas-tight manner, and some or all of said spacer strips being tapered in the direction normal to the plate surfaces, thereby introducing curvature in the intercooler for fitting it to the available space.

2. A heat exchanger comprising a plurality of plates arranged consecutively, spacer strips for separating each plate from the adjacent plates, said spacer strips on one side of any plate lying at an angle to the spacer strips on the other side of the plate, said spacer strips and plates being fastened at their faces of contact in a gas-tight manner, thereby forming passages and some or all of said spacer strips being tapered thereby introducing curvature in the intercooler for fitting it to the available space.

3. A heat exchanger comprising a plurality of curved plates arranged consecutively, a plurality of parallel spacer strips conforming to the plate surfaces for separating each plate from the adjacent plate, said spacer strips on one side of any plate lying at an angle to the spacer strips on the other side of the plate, the outermost of said spacer strips being attached to said plates along their faces of contact in a gas-tight manner and some or all of said spacer strips being tapered thereby introducing curvature in the intercooler for fitting it to the available space.

BENJAMIN PINKEL.